BATTERY SAFETY FILLING DEVICE
Filed Nov. 29, 1968 3 Sheets-Sheet 1
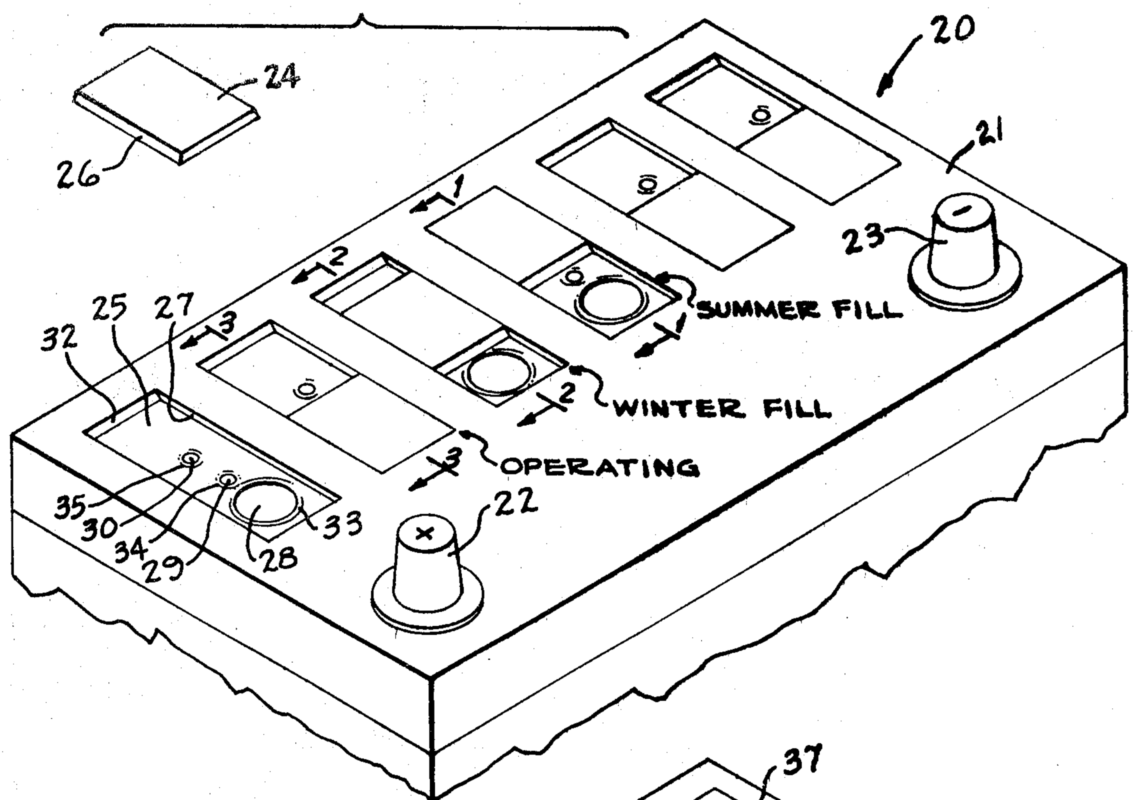
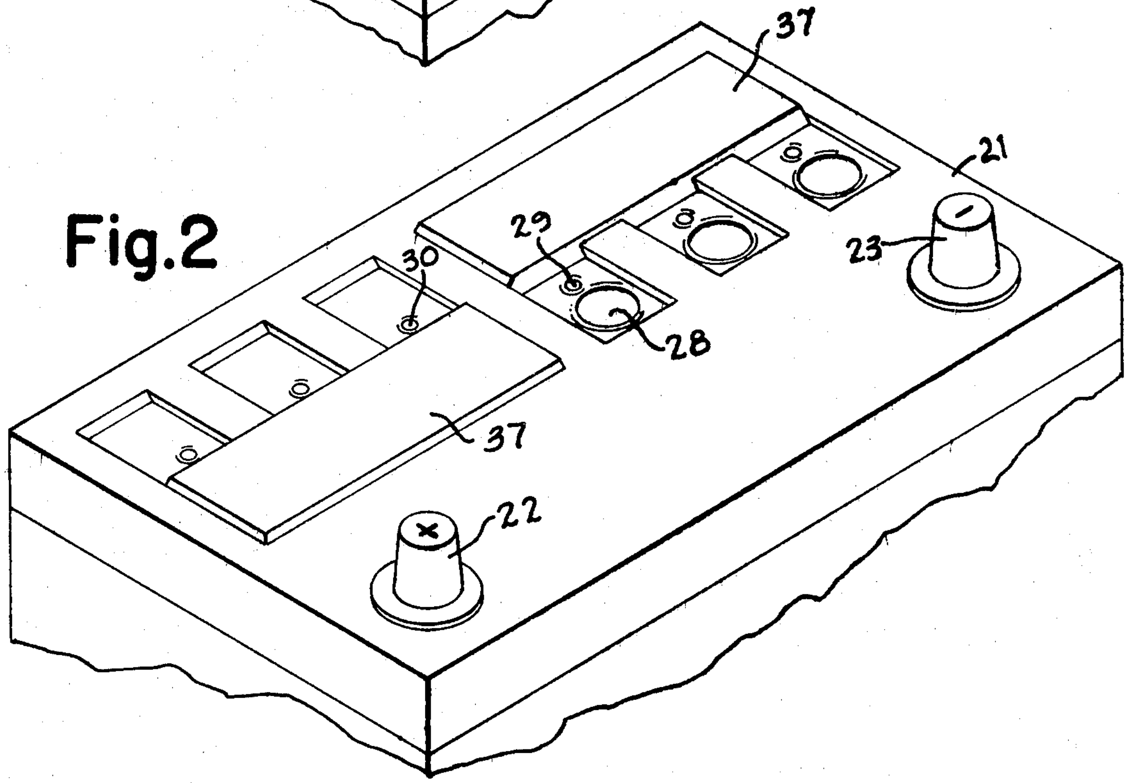

Fig.7
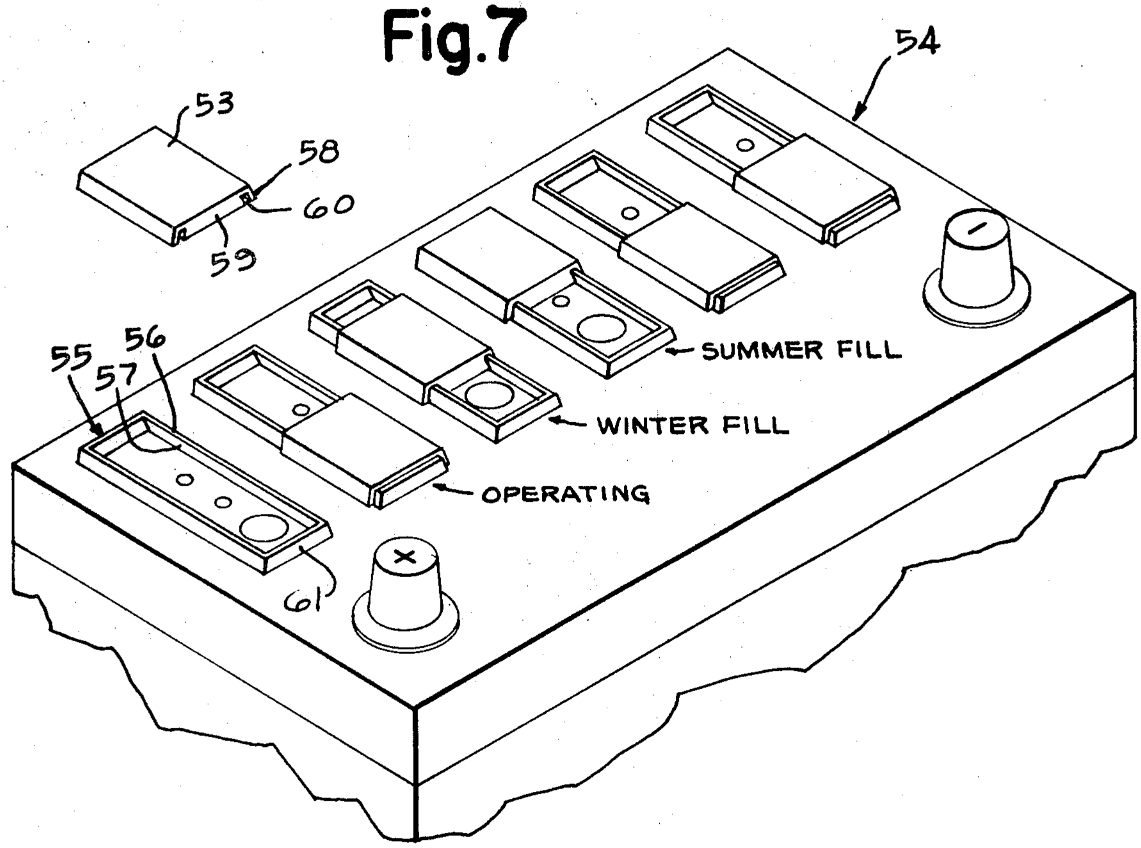
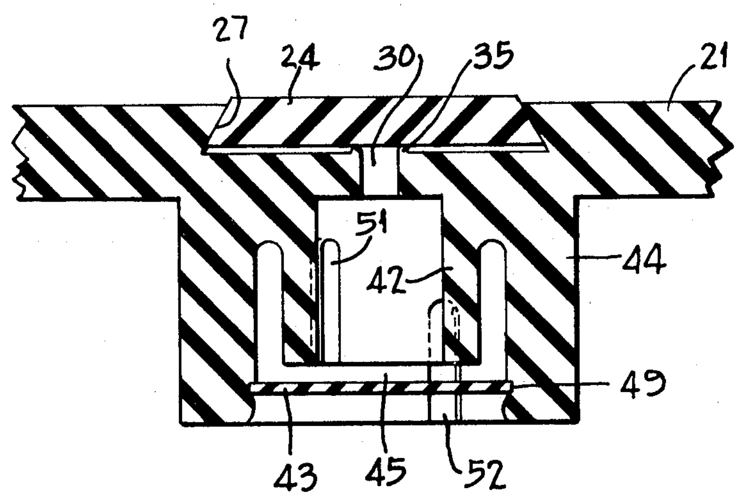
Fig. 6

3,560,266
Patented Feb. 2, 1971

3,560,266

BATTERY SAFETY FILLING DEVICE

Eugene W. Mossford, Novelty, Ohio, assignor to ESB Incorporated, a corporation of Delaware Filed Nov. 29, 1968, Ser. No. 779,701
Int. Cl. H01m 7/00
U.S. Cl. 136—177 6 Claims

ABSTRACT OF THE DISCLOSURE

An automatic, dual level, safety filling device is incorporated in the cover of a lead acid battery and comprises three openings in the cover over each cell and are referred to as the winter hole, summer hole, and vent hole respectively. A closure is slidably attached to the cover to close the winter and summer holes, or the summer and the vent holes, or the vent hole only. When the battery needs servicing, water or electrolytic solution is poured into the uncovered winter hole and depending upon whether the closure covers the summer hole and the vent hole, or the vent hole only the solution in the cell rises to a "winter level" or to a "summer level" respectively.

The discussion of the background of this invention is not to be construed in any way as limiting the scope of the invention, it being understood at all times that the device disclosed herein can be suitably used in a variety of applications where it is desired to fill a container with a liquid substance to a pre-selected level automatically and easily. However, for simplicity, this discussion will chiefly concern electric storage batteries generally classified as "wet" batteries since a liquid electrolyte is used. In particular, much of the following will be concerned with lead acid batteries to which the device of this invention is especially adaptable and in the light of which the uniqueness of this invention is easily explained.

Throughout the history of lead-acid or automobile batteries much attention and energy has been directed to providing safe and efficient means for filling and venting such batteries. It is necessary to the proper operation of a battery and to prevent damage to the electrodes that the level of the electrolyte in the battery be above the top of the electrodes. Therefore, it is necessary that one be able to fill the battery with electrolyte to the proper level with some degree of accuracy. Also, since acid electrolyte is involved it is desirable that safety precautions be provided in the filling operation to prevent injury to the person filling the battery. Also due to the electrochemical reactions occurring inside the battery during operation, gases are evolved and it is necessary to allow these to escape to the atmosphere, otherwise a pressure will build up inside the battery and damage it seriously.

It is relevant to this discussion, and to this invention, to consider what is the proper level of the electrolyte in the battery. At a minimum the electrode plates in each cell should be immersed in in the electrolyte in order to avoid any damage to the plates. The level of electrolyte above the plates is varied according to the environmental temperature so as to obtain optimum performance from the battery. Therefore, in warm weather when the water in the electrolyte tends more readily to evaporate, it is good practice to have the electrolyte level well above the top of the electrode plates. In colder climates, however, it is best to have the electrolyte level at a point lower than that used in warmer weather since the specific gravity of the electrolyte is higher, which inturn affords greater starting power.

The device of this invention enables a person to fill the battery to the level desired automatically and reduces to a minimum the possibility of underfilling or overfilling the battery so that no electrolyte spills out during filling. After the battery has been filled, this invention prevents the electrolyte from escaping from the battery even when subjected to considerable vibration.

SUMMARY OF THE INVENTION

It is therefore a principal object of this invention to provide a dual level, safety filling device for use in the cover of a container such as a battery casing. The filling device of this invention accomplishes the further object of automatically indicating when the container has been filled to the level desired as well as minimizing the chance of electrolyte spilling over onto the battery cover as a result of overfilling the container.

It is also an object of this invention to provide in the cover of a container a filling device which comprises a sliding closure and a plurality of tubular openings that extend down into the container different distances so that by selectively covering some of the openings with the closure, one can determine the level to which he will fill the container with a liquid.

It is another object of the invention to provide a safety filling device for an electric storage battery whereby the battery may be easily serviced and the electrolyte level maintained at the proper level for either cold or warm climates.

Another important object of this invention is to provide a novel means for venting gases from an electric storage battery while simultaneously preventing the escape of electrolyte from the battery.

With the device of this invention therefore it is now possible for a person servicing a battery to determine at a glance if the electrolyte is at the proper level and if required, to add the correct amount of water to the battery in order to raise the electrolyte level to the proper level as determined by the climatic temperature. Also due to the design of this device, the person filling the battery has sufficient warning that he has added enough so he can stop before the battery is overfilled and the electrolyte spills out onto the battery cover.

BRIEF DESCRIPTION OF THE DRAWINGS

FIG. 1 is a partial of a 12 volt battery showing the battery cover with the device of this invention over each of the battery's six cells;

FIG. 2 is a partial view of a 12 volt battery having the device of this invention using "gang" type closures;

FIG. 6 is a detailed drawing of the section taken along line 6—6 of FIG. 5; and FIG. 7 illustrates an alternative construction of the device of this invention wherein each closure is slidably mounted on a frame molded on the battery cover.

DESCRIPTION OF THE PREFERRED EMBODIMENTS

Figure 3:
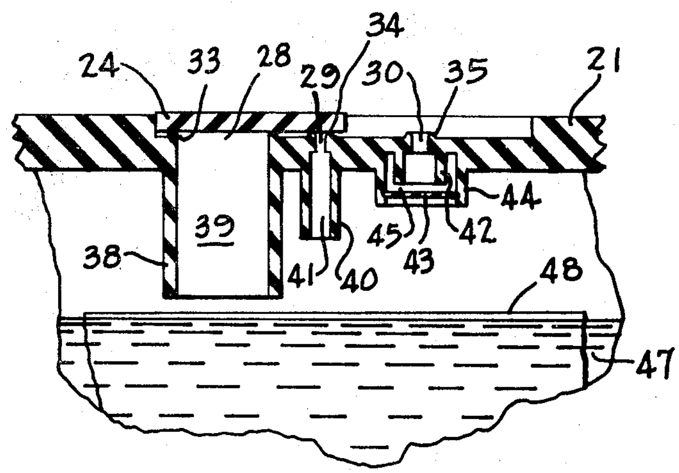
FIG. 3 is a fragmentary schematic drawing in cross section taken along lines 3—3 of FIG. 2 illustrating the device of this invention in the "operating" position over one cell of the battery.

Although the following description as well as the various figures will relate to the application of this invention on a battery cover, it is in no way intended thereby to limit the scope of this invention since it is contemplated that the device disclosed herein is adaptable to many uses.

The device of this invention basically comprises integrally providing in the cover of a container three tubular openings which for simplicity are called winter hole, summer hole and vent. The summer and winter holes are disposed to extend down into the container different distances and the vent has a baffle within a cavity to permit gas, but not liquid to escape from the container. A closure is slidably mounted on the container cover and is capable of sliding back and forth thereby closing either the winter and summer openings, the summer and vent openings or the vent opening alone. When the closure covers the winter and summer holes it is in the "operating" position; when it covers the summer hoel and the vent, it is in the "winter fill" position; and when it covers the vent only, it is in the "summer fill" position. Liquid is normally poured through the winter hole whenever it is desired to fill the cell to the pre-determined level. When used in an electric storage battery, there is provided a device of this invention over each cell of the battery.

Therefore, referring to FIG. 1 there is shown the upper section of a battery 20 with a cover 21 placed thereon. The positive terminal 22 and the negative terminal 23 are shown extending above the cover. The figure shows a 12 volt battery which has six individual cells inside the battery and are not shown. Over each cell there is provided a device of this invention. Each device basically comprises a sliding closure and three holes in the cover over each cell. Each closure 24 is free to slide in a groove 25 molded in the battery cover and depending on its position, seals one or two of the three holes.

In FIG. 1 there is illustrated the various positions of the sliding closure in the groove. In addition, the device nearest the positive terminal 22 has its closure 24 suspended above the battery to permit a detailed description of the parts of the device. Thus, there is shown a rectangular groove 25 molded in the cover 21 and forming tapered undercuts 27 in the cover. In the groove there are three holes which, as will be shown later, project different distances down into the battery cell. The largest hole 28 is referred to as the winter hole and it is preferably through this opening that electrolyte or water is poured into the battery. The intermediate sized hole 29 is referred to as the summer hole and the third, smallest hole 30 is the vent hole.

The closure 24 shown removed from its place on the battery cover is a flat piece with slanting side walls 26. In assembling the device the closure 24 is snapped into the groove 25 so that the walls 26 fit into the undercuts 27 and retain the closure in the groove. The closure is free to slide back and forth in the groove, being stopped at either end by an end wall 32 of the groove. The cover 21 and the closure 24 are preferably made of polystyrene, although other plastic materials may easily be substituted for this material.

In order to assure a good sealing effect by the closure when it is placed over the holes in the battery cover, there is provided in the cover a small bead about the rim of each hole. Therefore, a bead 33 rims the winter hole, and similar beads 34 and 35 are about the summer and the vent holes respectively. When the closure is moved to cover a hole it rides over the bead about that hole with the result that good pressure contact is made between the closure and the area around the hole so as to seal the hole.

In FIG. 1 there are also shown other filling devices in the cover 21 with each device being positioned over a corresponding battery cell located beneth the cover in the battery 20. Some of the devices have the closure 24 located in different positions and for clarity the terms "Operating," "Winter Fill," and "Summer Fill" are used to designate the various positions. At this point it is appropriate to define what is meant by the names which are used to designate these positions of the closure.

By "Operating" is meant the position of the sliding closure whereby the winter and summer holes are covered while the vent hole is open to the atmosphere. The closure 24 is in the "Operating" position therefore when the level of electrolyte in the cell is not being checked or added to.

By "Winter Fill" is meant the position of the closure whereby the summer and vent holes are covered while the winter hole 28 is open to the atmosphere. Therefore, when one wishes to check the level of electrolyte in the cell he slides the closure off winter hole 28 and looks down into the cell. If he desires to add water to the battery, and if it is the cold season of the year, he pours the water down the winter hole while the closure covers the summer and vent holes. Due to the novel features of this invention he will be able to determine visually when he has added the amount of water which is proper in cold climates.

By "Summer Fill" is meant the position of the closure whereby it covers the vent hole only, leaving the winter and summer holes, 28 and 29 respectively, open to the atmosphere. When the closure is in this position, a person is able to add water to the cell preferably through the winter opening 28 and is able to determine visually when the level of electrolyte in the cell has been brought up to the level proper for operation in warm temperatures.

Figure 4:
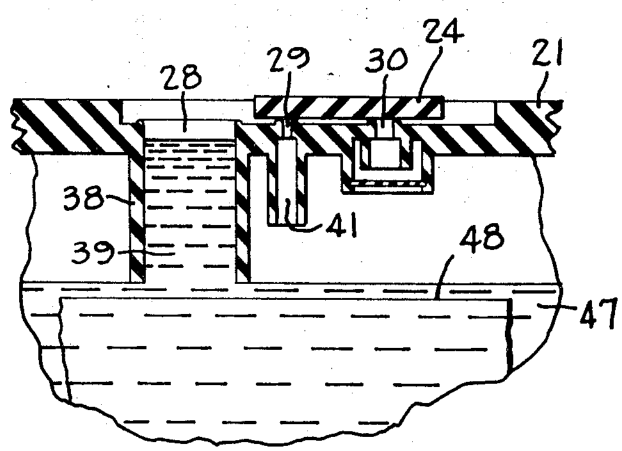
FIG. 4 is a fragmentary schmatic drawing taken along lines 4—4 of FIG. 2 with the device of this invention in the "winter fill" position.
Figure 5:
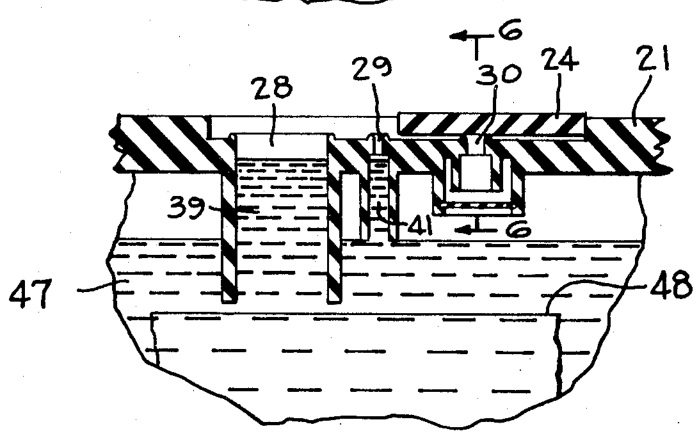
FIG. 5 is a fragmentary schematic drawing taken along lines 5—5 of FIG. 2 with the device of this invention in the "summer fill" position.

An understanding of these three positions will be better obtained from the description of FIGS. 3, 4 and 5 which are schematic drawings in cross section of the three closure positions defined above.

In FIG. 2 there is shown an arrangement whereby two "gang" type closures 37 are used in a 12 volt battery instead of the six individual closures shown in FIG. 1. The battery cover 21 is the same as that of FIG. 1 so that the individual and the "gang" type closures are interchangeable on the cover. The closures are not flush with the battery cover as are the individual closures of FIG. 1, although they preferably are made to have a minimum thickness above the cover 21.

The closures 37 therefore are molded in one piece to cover three cells and can be considered as three individual closures connected in tandem and moving back and forth as a unit. Each closure has slanted end walls and two cut-outs which also have slanted walls so that each slanted wall snaps into the corresponding undercut in the walls of the grooves as discussed in FIG. 1.

The closures operate in the same fashion as the individual closures of FIG. 1, except for the fact that when one "gang" closure is moved off the "Operating" position it is possible to check three cells at the same time. The "Operating," "Winter Fill," and "Summer Fill" positions have the same meaning as previously defined.

The number of cells covered by a "gang" closure is a practical choice since it clearly is conceivable to have a closure that can cover two ells as well as to have a "gang" closure for all six cells. Practical considerations, however, favor a "gang" closure for three cells. Also, each closure can be one solid closure that fits into one large groove in the cover over three cells. The conceivable modifications are numerous, however it is preferable that a uniform battery cover be provided as shown in FIGS. 1 and 2 and that the particllar "gang" closure of FIG. 2 be provided so that the individual and the "gang" closures be interchangeable on the cover.

FIG. 3 shows a schematic cross section taken along lines 3—3 of FIG. 1 with the closure 24 in the operating position. The winter hole 28 and the summer hole 29 are shown covered by the closure while the vent hole 30 is open. For clarity the height of beads 33, 34 and 35 are exaggerated and the closure is not flush with the battery cover. Walls 38 extend down into the battery from the periphery of the winter hole 28 and define passageway 39 for pouring liquid into the battery. Similarly walls 40 extend down into the battery from the periphery of the summer hole 29 to define a narrow passage 41. As can readily be seen, walls 40 are shorter than walls 38. A vent cavity 45 is formed by the outer tubular extension 44 which projects from the cover down into the battery in the area under the vent hole 30 and is closed at the bottom by a diaphragm 43. A baffle 42 is within the vent cavity and this, together with other features of the venting system, will be considered in more detail when FIG. 5 is discussed.

The level of the electrolyte 47 is shown in FIG. 3 as being slightly below the top of the electrode 48. Since the closure is in the operating position, this electrolyte can only escape from the battery through the vent hole 30. However, the vent cavity 45 is designed to prevent any electrolyte from splashing out the vent so that the battery is ready for operation and any gases formed in the cell shown will be vented. The level of the electrolyte has been indicated to be low enough to require the addition of water in order that there will be sufficient electrolyte in the cell to be certain that the battery may be operated without fear of damaging the cell electrodes. The proper level of the electrolyte is determined in part by the weather conditions prevailing. In particular, since water evaporates quicker in warm climates, it is best that as large an amount of water as possible be added in warm climates. FIGS. 4 and 5 illustrate how the device of this invention enables one to fill a cell with the proper quantity of water for either the cold or the warm season of the year.

FIG. 4 is a cross sectional drawing taken along lines 4—4 of FIG. 1 wherein the closure 24 has been moved to the winter fill position so that the summer and vent holes are now sealed. Water has been added to the cell by pouring the liquid down the winter hole 28 and its corresponding passage 39. The electrolytic fluid 47 is shown having already risen, due to the addition of the water, up to the bottom of the passage 39 and has even passed up into that passage. One can easily understand what has occurred by noting that the closure has sealed the summer and vent holes during filling. Therefore, as the fluid in the cell rose with the addition of water, the air in the cell, displaced by the addition of the water, escaped through the passage 39 and winter hole 28. When the level of the electrolytic solution reached the bottom of the passage 39 it sealed off this escape path for the displaced air and an air lock formed in the cell area above the electrolyte and under the battery cover. Due to the air lock in the cell, as more water was added it began to fill the passage 39 up to the point illustrated in the figure. At this point, the operator knows that he has added the proper amount of water for safely and efficiently operating the cell in cold climates and stops adding water so that no electrolyte will spill out of the winter hole onto the battery. When the closure 24 is returned to the operating position of FIG. 3, the vent 30 is opened and the air lock within the cell is released so that the fluid in the passage 39 is free to drain into the cell and the electrolyte level will be at or very near the bottom of that passage.

FIG. 5 is a cross sectional view taken along lines 5—5 of FIG. 1 to illustrate what occurs when the cell is to be filled for operation during warm climates. As in FIG. 4, the water has already been added to the cell in FIG. 5. The closure 24 is shown covering the sealing the vent hole 30 only so that as water was added to the cell through the winter hole 28 and passageway 39 the air displaced in the cell was free to escape to the atmosphere through both the winter hole 28 and the summer hole 29 and their associated passages. When the electrolyte reached the level of the winter passage 39 and began to rise in that passage the displaced air was still free to escape from the cell through summer hole 29. However, once the electrolyte reached the bottom of passage 41 an air lock was formed in the cell and with the addition of more water the electrolyte began to rise in passages 39 and 41 to the level shown in FIG. 5. At this point the operator knows that the proper quantity of water has been added for operation in warm temperatures and stops adding water so that no electrolyte will spill out on the battery casing and be wasted or possibly cause damage or injury. When the closure is returned to the operating position, the vent is opened so that the air lock is released permitting the fluid in passages 39 and 41 to drain into the cell. The level of the electrolyte in this case will be at the bottom of the summer passage 41 so that the passage 39 will be partially filled with electrolyte.

FIG. 6 is a cross sectional view of the vent and its baffling system taken along lines 6—6 of FIG. 5. There is shown a cavity 45 which depends from the cover 21 into the container and is formed by the tubular extension 44 and diaphragm or membrane 43. The diaphragm 43 is snapped into place and retained by rib 49 which is molded in the inner wall of extension 44. The diaphragm acts as a bottom for the cavity 45 to prevent electrolyte within the battery from splashing directly out through vent hole 30. A baffle 42 is disposed within the cavity 45 and is open at the bottom. The baffle preferably is a tubular extension which depends from the cover and terminates with its open end a distance above the diaphragm 43. The vent hole 30 communicates with the interior of the baffle which preferably is concentric with tubular extension 44.

Both the baffle and the cavity have a pair of oppositely aligned slits in their walls. One slit in the baffle is shown at 51 and one slit in the cavity is shown at 52. These slits, as well as the corresponding opposite slits in each pair, are preferably offset from each other approximately 90°. Due to this baffling arrangement within the cavity an effective device for venting gases from the battery is achieved.

Thus, when gases formed within the battery pass through slit 52 into the cavity 45, the gases easily flow into the interior of the baffle 42 through slit 51 and escape to the atmosphere through vent hole 30.

However, if electrolyte should splash up into the cavity 45 through the slit 52 it does not have a direct path to follow into the interior of the baffle 42 since the slit 51 is offset from the slit 52 as previously described. Therefore, the electrolyte settles in the bottom of the cavity 45 on the diaphragm 43 below. The electrolyte then flows out through slit 52 back into the battery. Since the baffle is open at its bottom above the diaphragm 43 it is also possible for gases to flow directly from the cavity through the open bottom of the baffle and out the vent hole 30. Electrolyte which has settled to the bottom of the cavity does not splash up from the diaphragm through the open bottom of the baffle and out the hole 30 as might be expected. Instead the electrolyte either remains at the bottom of the cavity or drains into the battery through one of the slits 52.

FIG. 7 illustrates an alternate construction of the device of this invention wherein each closure is slidably mounted on a frame which is molded in the cover around each set of three holes over a battery cell. One of the closures 53 is shown suspended above the battery 54 in order to permit a view of the frame 55 and the three holes. The three holes 28, 29 and 30 are the same as in FIG. 1 and project down into the battery cell in the same manner with the largest being the Winter hole and the intermediate being the Summer hole and the smallest being the vent hole. Again a bead is provided around the rim of each hole to assure good pressure contact with the closure and thereby affect a good seal when the closure is over a hole.

The frame has tapered side walls or tracks 56 so that the tracks are thicker at the bottom than at the top. The tracks are tapered outwards so that undercuts 57 are formed inside along the bottom of tracks 56. The closure has slanted side walls 58 which parallel the tapered tracks of the frame and has a rectangular center block 59 with open channels 60 between the block and the slanted side walls. When the closure 53 is snapped down onto the frame 55, the tapered frame walls are pressed into the channels and engage the center block in the undercuts. Of course the center block is designed not to fit perfectly in the undercuts so that a loose fit results enabling the closure to slide back and forth easily. Although the closure is able freely to slide back and forth on the tracks, it will not be easily dislodged from the frame due to the force fit resulting when the closure is snapped down onto the frame. The end walls 61 of the frame stop the sliding motion of the closure at either end of the tracks so that the closure moves between the "Operating," "Winter Fill," and "Summer Fill" positions as defined and described previously. Polystyrene again is the preferred material in making the closure and battery cover, although other suitable materials are apparent to those skilled in the art.

Just as in the preferred mode of this invention, gang type arrangements of the closure and frame modification can be made. Therefore a closure which has the appearance of three closure connected in tandem can be made to be mounted on three frames. Or one large frame surrounding three sets of holes can be made together with one large closure so that the frame and closure are merely enlarged versions of the closures and frames shown in FIG. 7.

The invention disclosed herein has application to other areas besides batteries and the discussion of the preferred embodiment with respect to batteries is not meant as limitative of the scope of the invention. All modifications that retain the spirit and basic teaching of this invention are intended to be included within the scope of the invention.

What I claim is:

1. A dual level filling device for use in an electric storage battery comprising in combination a cover for said battery, said cover having a first, a second, and a third opening therethrough, a first structure extending from said cover and defining a passageway having one end thereof in communication with the interior of said battery when said cover is in position on said battery, a second structure extending from said cover and defining a second passageway having one end thereof in communication with said second opening and the opposite end thereof in communication with the interior of said battery when said cover is in position on said battery, said first and second structures extending different ditsances down into said battery when said cover is in position on said battery, and closure means slidably mounted on said cover for movement to one of three positions for selectively closing said openings corresponding to:

- a first position wherein no filling of the battery takes place;
- a second position wherein said battery may be filled to the lower of two levels; and
- a third position wherein said battery may be filled to the higher of two levels.

2. A filling device of claim 1 wherein said cover has a groove molded therein, said first, second and third openings being located in said groove, said groove having tapered side walls forming undercuts in said cover, and said closure having slanted side walls whereby said closure is snapped into said groove and slidably mounted therein with said side walls disposed in said undercuts.

3. A filling device of claim 1 wherein a raised frame is carried by said cover and is defined by two end walls and two side tracks, said tracks being tapered, said closure having channels disposed to receive said tracks and said closure slidably mounted on said frame in a force fit fashion with said tracks disposed in said channels.

4. An electric storage battery comprising a container having an upper portion defining a cover therefor, said cover having a witner hole, a summer hole and a vent hole therein, said winter hole communicating with a first passageway comprising a first tubular structure depending from said cover and projecting a distance into said container, said summer hole communicating with a second passageway comprising a second tubular structure depending from said cover and projecting a distance into said container less than that of said first tubular structure, and a closure slidably mounted on said cover whereby said closure in one position closes said winter hole and said summer hole and in another position closes said summer hole and said vent hole and in a last position closed said vent hole only.

5. A filling device of claim 4 wherein said closure and cover are made of polystyrene.

6. A filling device of claim 4 wherein said battery container is divided into more than one battery cell compartment, said cover has a set of holes comprising said winter, summer and vent holes over each cell and said closure is a "gang" type closure adapted to slide over more than one set of said holes.

References Cited

UNITED STATES PATENTS

| | | | |
|---|---|---|---|
| 1,269,096 | 6/1918 | Land | 136—178X |
| 2,220,005 | 10/1940 | Smith | 136—162X |
| 2,646,459 | 7/1953 | Gill | 136—177 |
| 2,649,494 | 8/1953 | Martin | 136—177X |
| 2,786,090 | 3/1957 | Wells | 136—178X |
| 2,861,118 | 11/1958 | Rolph | 136—178X |
| 3,218,198 | 11/1965 | Havlick | 136—177 |

DONALD L. WALTON, Primary Examiner

U.S. Cl. X.R.

116—118; 136—182